(12) United States Patent
Duan (10) Patent No.: US 8,440,265 B2
(45) Date of Patent: May 14, 2013

(54) WATER- AND HEAT-RESISTANT SCRATCH-AND-SNIFF COATING

(75) Inventor: Biao Duan, Appleton, WI (US)

(73) Assignee: Appleton Papers Inc., Appleton, WI (US)

( * ) Notice: Subject to any disclaimer, the term of this patent is extended or adjusted under 35 U.S.C. 154(b) by 457 days.

(21) Appl. No.: 12/761,026

(22) Filed: Apr. 15, 2010

(65) Prior Publication Data

US 2011/0253584 A1    Oct. 20, 2011

(51) Int. Cl.
    *B05D 3/02*    (2006.01)
(52) U.S. Cl.
    USPC ......... 427/385.5; 427/379; 427/417; 428/905
(58) Field of Classification Search .................. None
    See application file for complete search history.

(56) References Cited

U.S. PATENT DOCUMENTS

| | | |
|---|---|---|
| 2,369,847 A | 12/1941 | Olsen et al. |
| 3,041,180 A | 6/1962 | Swisher |
| 3,655,129 A | 4/1972 | Seiner |
| 3,956,172 A | 5/1976 | Saeki et al. |
| 3,965,033 A | 6/1976 | Matsukawa et al. |
| 4,001,438 A | 1/1977 | Marmo et al. |
| 4,243,224 A | 1/1981 | Spector |
| 4,254,179 A | 3/1981 | Carson, III |
| 4,515,769 A | 5/1985 | Merritt et al. |
| 4,534,891 A | 8/1985 | Boden |
| 4,606,913 A | 8/1986 | Aronson et al. |
| 4,687,203 A | 8/1987 | Spector |
| 4,695,463 A | 9/1987 | Yang et al. |
| 4,717,017 A | 1/1988 | Sprinkel, Jr. et al. |
| 4,720,423 A | 1/1988 | Fraser |
| 4,810,534 A | 3/1989 | Seaborne et al. |
| 4,880,649 A | 11/1989 | Holzner et al. |
| 4,898,633 A | 2/1990 | Doree |
| 4,983,404 A | 1/1991 | Raman et al. |
| 5,004,595 A | 4/1991 | Cherukuri et al. |
| 5,112,688 A | 5/1992 | Michael |
| 5,114,735 A | 5/1992 | Rua, Jr. |
| 5,137,036 A | 8/1992 | Southwick |
| 5,145,842 A | 9/1992 | Driedger |
| 5,228,461 A | 7/1993 | Chan |
| 5,249,676 A | 10/1993 | Ashcraft et al. |

(Continued)

FOREIGN PATENT DOCUMENTS

| | | |
|---|---|---|
| EP | 0 426 428 | 5/1991 |
| EP | 0 749 697 | 12/1996 |

(Continued)

*Primary Examiner* — Timothy Meeks
*Assistant Examiner* — Michael P Rodriguez
(74) *Attorney, Agent, or Firm* — Muncy, Geissler, Olds & Lowe, PLLC (57) ABSTRACT

A scratch-and-sniff coating is provided comprised of a first coating on a substrate having a water- and heat-resistant second coating thereon, the first coating being comprised of a non-encapsulated flavor/fragrance component and a polysaccharide component, and the second coating comprised of a shellac component. The scratch-and-sniff coating is made by forming a first coating comprised of a non-encapsulated flavor/fragrance component and a polysaccharide component and drying the first coating, and forming a water- and heat-resistant shellac-containing second coating on the first coating, and drying the second coating. An encapsulated flavor/fragrance component may optionally be present in the first coating. The scratch-and-sniff coating can be applied to a package for a consumer article.

12 Claims, 3 Drawing Sheets

U.S. PATENT DOCUMENTS

| | | | |
|---|---|---|---|
| 5,288,632 A | 2/1994 | Pannell | |
| 5,290,547 A | 3/1994 | Bilbrey | |
| 5,301,693 A | 4/1994 | Chan | |
| 5,567,438 A | 10/1996 | Cook | |
| 5,635,229 A | 6/1997 | Ray | |
| 5,641,535 A | 6/1997 | Eck et al. | |
| 5,759,599 A | 6/1998 | Wampler et al. | |
| 5,816,421 A * | 10/1998 | Clodfelter et al. | 215/201 |
| 6,030,641 A | 2/2000 | Yamashita et al. | |
| 6,045,835 A | 4/2000 | Soper et al. | |
| 6,102,224 A | 8/2000 | Sun et al. | |
| 6,143,707 A | 11/2000 | Trinh | |
| 6,302,950 B1 | 10/2001 | Golz-Berner et al. | |
| 6,312,760 B1 | 11/2001 | Wheeler | |
| 6,793,949 B2 | 9/2004 | Panesar | |
| 7,117,631 B2 | 10/2006 | Peters | |
| 2004/0115091 A1 | 6/2004 | Beerling | |
| 2005/0220996 A1* | 10/2005 | Berger et al. | 427/213 |
| 2006/0233917 A1 | 10/2006 | Shobu et al. | |
| 2006/0246265 A1* | 11/2006 | Rogers et al. | 428/195.1 |
| 2006/0248665 A1 | 11/2006 | Pluyter | |
| 2007/0004610 A1 | 1/2007 | Brain | |
| 2007/0071684 A1 | 3/2007 | Crutchley et al. | |
| 2007/0128247 A1 | 6/2007 | Kato | |
| 2007/0207174 A1 | 9/2007 | Pluyter | |
| 2008/0138427 A1* | 6/2008 | Nagahara et al. | 424/490 |
| 2008/0176781 A1 | 7/2008 | Fadel | |
| 2009/0149368 A1 | 6/2009 | Hildebrand et al. | |

FOREIGN PATENT DOCUMENTS

| | | |
|---|---|---|
| GB | 2 367 002 | 3/2002 |
| WO | WO 85 02972 | 7/1985 |
| WO | WO 92/02145 | 2/1992 |
| WO | WO 96 37098 | 11/1996 |
| WO | WO 99/12640 | 3/1999 |
| WO | WO 00/37117 | 6/2000 |
| WO | WO 00/48574 | 8/2000 |
| WO | WO 02/30213 | 4/2002 |
| WO | WO 03/084516 | 10/2003 |
| WO | WO 2007/036814 | 4/2007 |
| WO | WO 2008/015652 | 2/2008 |

* cited by examiner

WATER- AND HEAT-RESISTANT SCRATCH-AND-SNIFF COATING

BACKGROUND OF THE PRESENT INVENTION

The present invention is directed to an improved scratch-and-sniff coating particularly for use in the food and beverage industry.

There are normally two approaches to providing a scratch-and-sniff coating. The most common approach is to encapsulate a flavor in microcapsules, and subsequently coat the microcapsules onto a substrate. However, this well known technique has two major disadvantages, particularly in the food and beverage industry. First, the technique is limited by the chemical composition of the flavor formulation. Since most flavor systems contain multiple chemical components, chemical and physical reactions such as polymerization, coacervation, etc. which may be necessary in the microencapsulation process may be adversely affected. Second, the technique is limited by the materials used to form the capsule walls. Wall materials such as aminoplast resins, or polyurethane, are prepared from toxic chemicals, such as formaldehyde and isocyanate, whose use in the food and beverage industry is discouraged.

A second approach is to disperse oil droplets in a polymer solution, and when the aqueous dispersion is allowed to dry to form a coating on the substrate, the oil droplets are entrapped in the dried polymer film. However, to achieve such a dispersion system, oil thickeners or bi-liquid foams are preferred. Since the coating matrix comprise water soluble polymers, the coating is not water resistant, which is required in the food and beverage industry. Such a technique is described in U.S. Pat. Nos. 5,290,547 and 6,312,760.

Scratch-and-sniff coatings are described, for example, in U.S. Pat. Nos. 3,655,129; 4,243,224; 4,254,179; 4,687,203; 4,898,633; 5,114,735; and 6,102,224, as well as WO 96/37098.

The use of fragrance or flavor delivery means on packages or beverage containers is known as shown by U.S. Pat. Nos. 4,717,017; 4,720,423; 5,249,676; 5,635,229; and 6,102,224.

OBJECTS AND SUMMARY OF THE INVENTION

It is accordingly an object of the present invention to provide a scratch-and-sniff coating suitable for use in the food and beverage industry.

It is further an object of the present invention to provide an improved method for the manufacture of a scratch-and-sniff coating suitable for use in the food and beverage industry.

In accordance with the present invention, there is thus provided a scratch and sniff coating comprised of a first coating on a substrate having a second coating thereon, the first coating comprised of a non-encapsulated flavor/fragrance component and a polysaccharide component, and the second layer comprised of a water- and heat-resistant shellac component.

The present invention also comprises a composition comprised of a non-encapsulated flavor/fragrance component in an aqueous composition of a polysaccharide.

In accordance with the present invention, there is further provided a method of making a scratch-and-sniff coating, comprising the steps of (a) forming a coating comprised of a non-encapsulated flavor/fragrance component and a polysaccharide component; (b) drying the coating of step (a); (c) forming a second coating comprised of a shellac component on the dried coating of step (b); and (d) drying the second coating.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PRESENT INVENTION

The present invention will be described in connection with FIGS. 1-7.

The scratch-and-sniff coating 60 of the present invention (FIGS. 1-7) is comprised of a first non-encapsulated flavor- or fragrance and polysaccharide-containing coating, and a second shellac-containing water and heat-resistant coating 40 covering the first flavor-containing coating on a desired substrate 20.

In the context of the present invention, the terms "flavor" and "fragrance" are used interchangeably, and are intended to include within their scope any substance capable of causing an olfactory sensation or response, including such substances such as flavorants, perfumes, odorants, scents, etc.

Certain flavorants may provide a taste sensation as well as an olfactory response, and may be advantageous from the standpoint of enhancing the consumer's response to a product wherein a product of the present invention is employed.

The first flavor/fragrance-containing coating is comprised of at least one non-encapsulated flavor/fragrance component in a polysaccharide matrix.

The first flavor-containing component is generally formed by forming a film-forming mixture of the flavor/fragrance component and the polysaccharide. The mixture is then formed into a coating 30 (FIG. 1) on a desired substrate 20, and subjected to drying conditions sufficient to form a dried coating. The first coating may be applied by brushing, spraying, painting or printing onto the desired substrate. The coating may be dried under a variety of conditions suitable to remove the liquid component from the coating. By way of example, the coating may be subjected to elevated temperatures on the order of 30~90° C. for a period of time sufficient to dry the coating. The use of reduced pressure may also be used to enhance the drying process.

As previously mentioned, the flavor/fragrance component may be either (1) water-soluble or water-miscible, as well as (2) water-immiscible or oil-soluble. The manner by which the flavor/fragrance component(s) is mixed with the polysaccharide depends upon such physical properties of the flavor/fragrance component.

For instance, if the flavor/fragrance component is water-soluble or water-miscible, an aqueous solution or dispersion of the component may be formed. The aqueous solution or dispersion may then be combined with an aqueous solution of the polysaccharide to form a combined aqueous solution or dispersion of the flavor/fragrance component(s) and the polysaccharide.

The manner by which the aqueous solution or dispersion of the water-soluble or water-miscible flavor/fragrance component and the polysaccharide is formed is not critical. For example, the polysaccharide may be combined with an aqueous solution or dispersion of the flavor/fragrance component, or the flavor/fragrance component(s) may be combined with an aqueous solution or dispersion of the polysaccharide, or an aqueous solution or dispersion of each may be combined together.

If a water-immiscible or oil-soluble flavor/fragrance component(s) is used in the first coating, the manner of combining such flavor/fragrance component(s) with the polysaccharide differs from the above instance in which a water-miscible or dispersible component is used. An emulsion of the flavor/fragrance component and the polysaccharide may be formed by known methods by use of appropriate emulsifiers/stabilizers together with mixing/stirring to form an oil-in-water emulsion. The dispersion or emulsion of the flavor/fragrance component(s) is then combined with the polysaccharide component in the same manner as discussed above.

Exemplary emulsifiers/stabilizers include but are not limited to polyvinyl alcohol, glycerin fatty acid esters, lactic acid esters of monoglycerides, lecithins, polyglycerol polyricinoleate, sorbitan esters of fatty acids, succinic acid esters of monoglycerides, diacetyl tartaric acid esters of monoglycerides, polyoxyethylene sorbitan esters of fatty esters, sucrose esters of fatty esters, and mixtures thereof, etc. Commercially available emulsifiers/stabilizers include, for example, TWEEN 20 (sorbitan monolaurate), PGPR 90 (polyglycerol polyricinoleate), VERV K (calcium stearoyl-2-lactylate), and SPAN 80 (sorbitan monoleate). Additional emulsifies include chemically modified starch, cellulose, and water-soluble proteins such as gelatin.

Exemplary stabilizers include at least one of a water-soluble monovalent metal salt, a polyvalent metal salt, or an acid. Suitable salts include salts of sodium, potassium, calcium, strontium, barium, aluminum, magnesium, etc., with calcium chloride being preferred.

The resulting emulsion should be stable, with the preferred average drop size being in the range of 5~20 microns. This may be achieved by a combination of emulsifier and mixing/shearing, which conditions can be determined by one having skill in the art.

The polysaccharide may be combined with the emulsion or dispersion of the flavor component, or the flavor component(s) may be combined with an aqueous solution or dispersion of the polysaccharide, or an aqueous solution or dispersion of the polysaccharide may be combined with an emulsion or dispersion of the flavor component.

The polysaccharide which is used in the present invention may be readily selected by one skilled in the art. Exemplary polysaccharides which may be used include but are not limited to alginic acid, alginic acid salts and derivatives thereof (such as propylene glycol alginate), pectin, locust bean gum, guar gum, pectinic acid, a pectinate, a pectate, polygalacturonic acid, carrageenan, cross-linkable cellulose or a derivative thereof (such as sodium-carboxymethylcellulose), xanthan gum, agar, cross-linkable starch or a cross-linkable guar gum. Pectin and alginate are preferred.

The polysaccharide may be converted to the form of a cross-linked hydrocolloid which entraps and immobilizes the flavor/fragrance component therein as deemed appropriate. The formation of polysaccharide hydrocolloids is well known to those skilled in the art. See, for instance, U.S. Pat. No. 4,695,463 directed to a delivery system for chewing gum which employs a polysaccharide hydrocolloid delivery system. Typical hydrocolloids may be formed from polysaccharides such as gums, pectins, alginates, by way of example. A cross-linked polysaccharide is also disclosed in U.S. Patent publication 2007/0128247.

The polysaccharide may be cross-linked with any suitable multivalent cation such as aluminum, calcium, strontium, barium, potassium, iron, magnesium, copper, zinc and mixtures thereof. The addition of the multivalent cation to the dispersion or mixture results in a transfer of multivalent for monovalent cations, whereby a crosslinked matrix is caused to form. The flavor/fragrance then becomes embedded within the hydrocolloid matrix. Calcium chloride is a preferred salt for use in the formation of a hydrocolloid. Depending on the amount of calcium chloride employed, the hydrocolloid may be thicker in consistency, or less thick. Generally, the salt component will be present in an amount in the range of up to 25% by weight of the mixture, more preferably from 0.02 to 15% by weight.

Polysaccharides such as alginates gel at low pH, so an acid may be used as a gelling agent.

By way of example, polysaccharides such as kappa-carrageenan can be gelled by the use of monovalent cations such as potassium ions. Therefore, potassium salts such as potassium chloride are good examples of gelling agents.

The weight ratio of flavoring/fragrance agent to polysaccharide in the coating mixture will generally range from about 1:9 to about 9:1. The particular weight ratio employed is not critical to practice of the invention. In fact, the amount of flavoring/fragrance employed is generally dependent on the ultimate flavor/fragrance result desired upon release of the flavor/fragrance from the scratch-and-sniff coating of the present invention.

As discussed above, the flavor/fragrance component may be either water-soluble or water-miscible, as well as water-immiscible or oil soluble. Multiple flavor/fragrance components may be employed, and may comprise mixtures of water-soluble or miscible, or water-immiscible or oil-soluble flavor/fragrance components. Such flavor/fragrance components are well known to those skilled in the art, and as a result, such flavor/fragrance components can be readily selected for use in the present invention.

By way of example, synthetic or natural flavoring/fragrance agents may be used, such as flavor oils and flavoring aromatics and/or oils, liquids, extracts, etc., derived from plants, leaves, flowers, fruits, etc. Suitable flavoring/fragrance agents include but are not limited to spearmint oil, cinnamon oil, oil of wintergreen, peppermint oil, clove oil, bay oil, anise oil, eucalyptus oil, thyme oil, cedar leaf oil, oil of nutmeg, allspice, oil of sage, mace, oil of bitter almonds, cassia oil, vanilla, citrus oils (orange, orange, grape, lime, grapefruit), fruit essences (apple, pear, peach, grape, strawberry, raspberry, cherry, plum, pineapple, apricot, etc.), among others.

Figure 1:
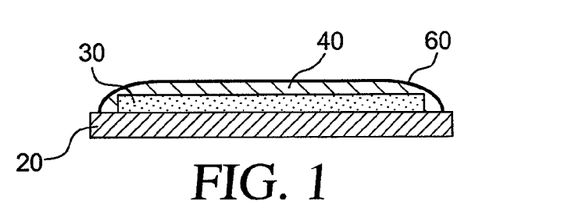
FIG. 1 depicts in cross-section the scratch-and-sniff coating of the present invention.
Figure 2:
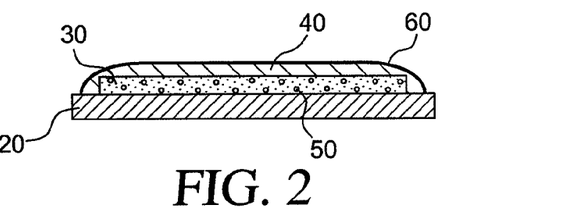
FIG. 2 depicts in cross-section an alternative embodiment of the scratch-and-sniff coating of the present invention.

While the first layer contains a flavor/fragrance component which is not encapsulated (i.e., which is not contained within microcapsules), the flavor- or fragrance-containing layer 30 may also include one or more flavor/perfume components contained within microcapsules 50 (FIG. 2). The term microcapsule relates to materials that surround an aromatic or core material in small capsules. Such capsules may range from sub-micron size to millimeter range, and are durable enough to resist handling, but soft enough to be broken as part of a scratch-and-sniff embodiment whereby the aromatic or core material is released into the atmosphere.

Microencapsulation generally involves mixing the material to be encapsulated (such as a scent or perfume, etc.) with a polymer, followed by the use of known methods to produce scent- or perfume-containing microcapsules. The microcapsule wall protects the enclosed scent or perfume (or other material) extending the life of the material. The microcapsules can be embedded in a layer or coating 30 on the surface of a substrate 20 awaiting use (FIG. 2), such as when a consumer scratches the surface layer 40 of a scratch-and-sniff perfume sample strip 60 (FIG. 7), causing the embedded perfume to be released due to fracturing of the microcapsules in the scratch-and-sniff coating strip 60.

Exemplary methods of producing such microcapsules include but are not limited to macro-emulsion processes, coacervation, entrapment/matrix encapsulation, etc. The amount and identity of the flavor/scent-producing agent in the microcapsule can be chosen to provide the desired flavor/scent release characteristics. As it is desired for the scratch-and-sniff coating to remain relatively inert until scratched whereby the microcapsule walls are fractured, the porosity and other physical characteristics of the capsule wall should be such as to inhibit migration of the flavor/scent into the environment prior to fracturing of the microcapsule wall. The selection and preparation of such microcapsules may be readily made by one skilled in the art. Suitable microcapsules may be obtained commercially, by way of example, from Ronald T. Dodge Co. of Dayton, Ohio. See also the teachings of U.S. Pat. Nos. 4,515,769; 4,720,423; 5,004,595; 5,301,693; 5,228,461; 5,137,036; 6,045,835; and 7,117,631 which are directed to the use of encapsulated flavor/fragrance components.

Such microcapsules may be incorporated into the polysaccharide composition by admixing same into the solution or dispersion of the non-encapsulated flavor/fragrance component and the polysaccharide prior to formation of the first coating and drying thereof.

A variety of flavor/fragrance core components may be employed with advantage in such microcapsules, the selection of which is well within the ability of one skilled in the art. The terms flavor/fragrance core materials and flavor/fragrance core components are used interchangeably for purposes of the invention. Suitable components include those capable of being encapsulated by the encapsulating polymer of the microcapsules.

For instance, exemplary flavor/fragrance core components are disclosed in EP 0 426 428; WO 00/37117; U.S. Pat. Nos. 2,369,847; 4,534,891; 5,112,688; and 5,145,842; as well as published application Nos. 2004/0115091; 2006/0248665; 2007/0004610; and 2007/0207174, each herein incorporated by reference.

Such materials may comprise, without limitation, extracts, essential oils, absolutes, resinoids, resins, hydrocarbons, alcohols, aldehydes, ketones, ethers, acids, esters, acetals, ketals, nitriles, etc.

Examples of flavor/fragrance core materials which can be used in the invention include but are not limited to geraniol, geranyl acetate, linalol, linalyl acetate, tetrahydrolinalool, citronellol, citronellyl acetate, dihydromyrcenol, dihydromyrcenyl acetate, tetrahydromyrcenol, terpineol, terpinyl acetate, nopol, nopyl acetate, 2-phenyl-ethanol, 2-phenylethyl acetate, benzyl alcohol, benzyl acetate, benzyl salicylate, sterilely acetate, benzyl benzoate, amyl salicylate, dimethylbenzylcarbinol, trichloromethylphenyl-carbinyl acetate, p-tert-butylcyclohexyl acetate, isononyl acetate, vetiveryl acetate, vetiverol, .alpha.-hexylcinnamaldehy-de, 2-methyl-3-(p-tert-butylphenyl)propanal, 2-methyl-3-(p-isopropylphenyl)-propanal, 2-(p-tert-butylphenyl)-propanal, 2,4 diethyl-cyclohex-3-enyl-carb-oxaldehyde, tricyclodecanyl acetate, tricyclodecanyl propionate, 4-(4-hydroxy-4-methylpentyl)-3-cyclohexenecarboxyaldehyde, 4-(4-methyl-3-pentenyl)-3-cyclohexanecarboxaldehyde, 4-acetoxy-3-pentyl-tetrahydropyran, 3-carboxymethyl-2-pentylcyclopentane, 2-n-heptylcyclopentan none, 3-methyl-2-pentyl-2-cyclopentenone, n-decanal, n-dodecanal, 9-decenol-1, phenoxyethyl isobutyrate, phenylacetaldehyde dimethyl-acetal, phenylacetaldehyde diethylacetal, geranyl nitrile, citronellyl nitrile, cedryl acetate, 3-isocamphylcyclohexanol, cedryl methyl ether, isolongifolanone, aubepine nitrile, aubepine, heliotropin, coumarin, eugenol, vanillin, diphenyl oxide, hydroxycitronellal, ionones, methylionones, isomethylionones, irones, cis-3-hexenol and esters thereof, indan musks, tetralin musks, isochroman musks, macrocyclic ketones, macrolactone musks, ethylene brassylate, etc.

Examples of essential oils useful as flavor/fragrance core materials include but are not limited to angelica root oil, anise oil, arnica blossom oil, basil oil, bay oil, bergamot oil, champaca blossom oil, noble fir oil, noble fir cone oil, elemi oil, eucalyptus oil, fennel oil, spruce needle oil, galbanum oil, geranium oil, ginger grass oil, guaiacwood oil, gurjun balsam oil, *helichrysum* oil, ho oil, ginger oil, iris oil, cajeput oil, calamus oil, camomile oil, camphor oil, canaga oil, cardamom oil, *cassia* oil, pine needle oil, copaiva balsam oil, coriander oil, spearmint oil, caraway oil, cumin oil, lavender oil, lemon grass oil, lime oil, mandarin oil, balm oil, musk seed oil, myrrh oil, clove oil, neroli oil, niaouli oil, olibanum oil, orange oil, *origanum* oil, palmarosa oil, patchouli oil, peru balsam oil, petitgrain oil, pepper oil, peppermint oil, pimento oil, pine oil, rose oil, rosemary oil, sandalwood oil, celery oil, spike oil, star anise oil, turpentine oil, *thuja* oil, thyme oil, verbena oil, vetiver oil, juniperberry oil, wormwood oil, wintergreen oil, ylang-ylang oil, hyssop oil, cinnamon oil, cinnamon leaf oil, citronella, lemon oil and cypress oil.

Other useful flavor/fragrance core materials can include oil or solvent dispersions or oil dispersions of ambrettolide, amylcinnamaldehyde, anethole, anisaldehyde, anisyl alcohol, anisole, methyl anthranilate, acetophenone, benzylacetone, benzaldehyde, ethyl benzoate, benzophenone, benzyl alcohol, benzyl acetate, benzyl benzoate, benzyl formate, benzyl valerate, borneol, bornyl acetate, bromostyrene, n-decylaldehyde, n-dodecylaldehyde, eugenol, eugenol methyl ether, eucalyptol, farnesol, fenchone, fenchyl acetate, geranyl acetate, geranyl formate, heliotropin, methyl heptanecarboxylate, heptaldehyde, hydroquinone dimethyl ether, hydroxycinnamaldehyde, hydroxycinnamyl alcohol, indole, iron, isoeugenol, isoeugenol methyl ether, isosafrol, jasmone, camphor, carvacrol, carvone, p-cresol methyl ether, coumarin, p-methoxyacetophenone, methyl n-amyl ketone, methyl methylanthranilate, p-methylacetophenone, methylchavicol, p-methylquinoline, methyl β-naphthyl ketone, methyl-n-nonylacetaldehyde, methyl n-nonyl ketone, muscone, β-naphthol ethyl ether, β-naphthol methyl ether, nerol, nitrobenzene, n-nonylaldehyde, nonyl alcohol, n-octaldehyde, p-oxyacetophenone, pentadecanolide, β-phenylethyl alcohol, phenylacetaldehyde dimethyl acetal, phenylacetic acid, pulegone, safrol, isoamyl salicylate, methyl salicylate, hexyl salicylate, cyclohexyl salicylate, santalol, skatole, terpineol, thymene, thymol, γ-undecalactone, vanillin, ethyl vanillin, veratrum aldehyde, cinnamaldehyde, cinnamyl alcohol, cinnamic acid, ethyl cinnamate, benzyl cinnamate, alkyl isothiocyanates (alkyl mustard oils), butanedione, limonene, linalool, linalyl acetate linalyl propionate, menthol, menthone, methyl-n-heptenone, phellandrene, phenylacetaldehyde, terpinyl acetate, citral and mixtures of any of the foregoing.

Depending on the application the flavor/fragrance core material can be a fragrance oil selected based on boiling point or clogP values as taught in U.S. Pat. No. 6,143,707. In certain embodiments of the composition, the flavor/fragrance core can be selected to have a clogP value of at least 3 and a boiling point of less than 260° C. In a yet further embodiment, the flavor/fragrance core can be selected based on molecular weight, density, diffusivity and/or partition coefficient to effect either a flash fragrance or a more sustained fragrance or both as desired for the end use application. Higher molecular weights and lower vapor pressures typically are more sustained odorant effects.

Flavor/fragrance core materials that are flash fragrances are described in US 2008/0176781 as having an acceleration value above 900 cm/sec$^2$. Examples of flavor/fragrance core materials having an acceleration value greater than 900 cm/sec$^2$ include: ethyl formate; ethyl acetate; ethyl propionate; ethyl 2-methylpropanoate; methyl hexyl ether; 2,6,6-Trimethylbicyclo-(3,1,1)-2-heptene; butyl butyrate; ethyl isovalerate; ethyl butyrate; ethyl-2-methylbutyrate; butyl acetate; hexanal; isopropyl-methyl-2-butyrate; beta-methyl butyl acetate; 6,6-dimethyl-2-methylenenorphane; pentyl acetate; propyl butyrate; 7-methyl-3-methylene-1,6-octadiene; (R)-(+)-p-Mentha-1,8-diene; 2,6-Dimethyl-2-heptanol; 2-ethenyl-2,6,6-trimethyltetrahydropyran; E-2-hexenal; 4-isopropyl-1-methyl-1,5-cyclohexadiene; cis-4-heptenal; methyl phenyl ether; 1-methyl-4-isopropyl-1,4-cyclohexadiene; ethyl 2-methylpentanoate; 3-methyl-2-butenyl acetate; hexyl formate; 1-methyl-4-isopropylidene-1-cyclohexene; 1,3,3-trimethyl-2-oxabicyclo[2.2.2]octane; 2,3-butanedione; 3,7-dimethyl-1,3,6-octatriene; ethyl hexanoate; cis-3-hexenyl formate; 6-methyl-5-hepten-2-one; 3-octanone; trans-2-hexenyl acetate; 2,2-Dimethyl-3-(3-methyl-2,4-pentadienyl)-oxirane; 2-(2'-methyl-1'-propenyl)-4-methyltetrahydropyran; Octanal; hexyl acetate; methyl-2,2-dimethyl-6-methylene-1-cyclohexanecarboxylate[0105] phenylethyl methyl ether; methyl phenyl carbinyl acetate; 3,3-dimethyl-8,9-dinorbornan-2-one; isobutyl cis-2-methyl-2-butenoate; cis-4-(isopropyl)-cyclohexane methanol; isoamyl butyrate; 2,6-dimethyl-2-hepten-7-ol; pentyl butyrate; tricyclo decenyl acetate; 5-methyl-2-(2-methylpropyl)-cis-3-Propylbicyclo(2.2.2)hept-5-ene-2-carbaldehyde; Methyl trans-1,4-dimethylcyclohexanecarboxylate; 1,3-Dimethylbutyl-2-butenoate; 4-(1-Methoxy-1-methylethyl)-1-methylcyclohexene; 2-Methyl-1,5-dioxaspiro[5.5]undecane; 3,6-Dihydro-4-methyl-2-(2-methylpropen-1-yl)-2H-pyran; 2-Propenyl hexanoate; cis-3-hexenyl isobutyrate; ethyl heptanoate; 2,4-dimethyl-3-cyclohexen-1-carbaldehyde; cis-3-hexenyl methyl carbonate; 1-Ethyl-3-methoxytricyclo[2.2.1.02,6]heptanes; 1-(3,3-Dimethylcyclohexyl)ethan-1-one; Nonanal; trans-2-hexenol; ol-1,7,7-Trimethylbicyclo[2.2.1]heptan-2-one 1,3-Dimethylbut-3-enyl isobutyrate; cis-3-hexenol; 3,7-dimethyl-7-methoxyoctan-2-ol; Methyl cyclopentylidene acetate; Benzaldehyde; Aldehyde C-6 dimethyl acetal; 3,7-Dimethyl-1,6-octadien-3-yl formate; 3,7-Dimethyloctanal; 2,6-dimethyl-2-heptanol; 4,5,6,7-Tetrahydro-3,6-dimethylbenzofuran; 1,3,5-Undecatriene; 2,5-dimethyl-2-octen-6-one; cis-3-hexenyl acetate; butyl 2-methyl pentanoate; 3,7-Dimethyl-6-octenal; dimethyloctenone; 2,4-Dimethyltetrahydro benzaldehyde; cis-3-hexenyl propionate; 2-isopropyl-5-methylcyclohexanone (isomer unspecified); 2-(1-Ethylpentyl)-1,3-dioxolane; 3-octanol; 2-phenylpropanal; 3,5,5-trimethyl hexanal; 1,3-undecadien-5-yne; 1-p-menthene-8-thiol; 1-Phenyl-4-methyl-3-oxapentane; 3,7-Dimethyl-3,6-octadienal; 3-Octenol; E-4-Decenal; cis-4-decenal; phenylacetaldehyde; 2-(1-methylpropyl)cyclohexanone; 2-Butyl-4,4,6-trimethyl-1,3-dioxane; cyclohexyl ethyl acetate; 1-octen-3-ol; Tricyclodecenylpropionate; 6-Butyl-2,4-dimethyldihydropyrane; 2,6-nonadienal; 3-phenyl butanal; 37-dimethyl-2,6-octadiene-1-nitrile; and Z-6-nonenal.

Materials useful as flavor/fragrance core materials that are characterized as a more sustained fragrance or odorant are taught as having an acceleration value of between 900 and 100 cm/sec$^2$ inclusive include: 3-phenyl butanal; 3,7-dimethyl-6-octenol; 2,6-dimethyl-7-octen-2-ol; 6-Butyl-2,4-dimethyldihydropyrane; 3,7-Dimethyl-2,6-octadienal; cyclohexyl ethyl acetate; 3a,4,5,6,7,7a-Hexahydro-5-methoxy-4,7-methano-1H-indene; methyl-2-octynoate; decanal; 3,-Dimethyl-1-octen-7-ol; (Z)-1-(1-Methoxypropoxy)hex-3-ene; Nonen acid nitrile; (Z)-3,4,5,6,6-Pentamethylhept-3-en-2-one; 2-Butyl-4,4,6-trimethyl-1,3-dioxane; 2-Heptytetrahydrofuran; hexyl butyrate; Ethyl octanoate; 2,2,5-Trimethyl-4-hexenal dimethyl acetal; Tricyclodecenylpropionate; p-cresyl acetate; 2-propenyl heptanoate; 2-methyl-3-(4-methoxyphenyl)propanal; Exo-1,7,7-trimethylbicyclo[2.2.1]hept-2-yl acetate; benzyl acetate; 2,6-dimethyl-2-octanol; 3,7-Dimethyl-2,6-octadien-1-thiol; Methyl 2-nonenoate; 4-Methyl-1-oxaspiro[5.5]undecan-4-ol; 2-Pentylcyclopentan-1-one; 3,7-Dimethyl-1,6-octadien-3-ol; ethyl acetoacetate; Decyl methyl ether; 1-Methyl-4-isopropenyl-6-cyclohexen-2-one; n-Hexyl 2-butenoate; 3,7-Dimethyl-1,6-octadien-3-ol acetate; p-Menth-1-en-8-yl acetate; 3,7-Dimethyloctan-3-yl acetate; 2-Methyl-4-propyl-1,3-oxathiane; alpha., 3,3-Trimethylcyclohexylmethyl acetate; alpha., 3,3-Trimethylcyclohexylmethyl formate; 3-phenylpropanol; 1,3,3-Trimethylbicyclo(2.2.1)heptan-2-ol; 2-Pentyl-3-methyl-2-cyclopenten-1-one; 3,7-Dimethyl-6-octen-3-ol; o-t-butylcyclohexyl acetate; 4-(1,1-Dimethylpropyl)cyclohexanone; Ethylacetoacetate ethylene glycol ketal; 3-Methylene-7-methyl-1-octen-7-ylacetate; 4-methylphenylacetaldehyde; 3,5,5-trimethylhexyl acetate; 4-Methoxy-1-propenylbenzene (E); p-Manthan-6-yl acetate; nonyl acetate; solongifolene oxide; methyl-2-nonynoate; benzyl propionate; 4-methoxyacetophenone; 3,7-dimethyloctan-3-ol; 1,7,7-Trimethylbicyclo(2.2.1)heptan-2-ol 3,7-Dimethyl-2-methyleneocta-6-enal; phenylacetaldehyde dimethyl acetal; 1-Methyl-4-isopropyl-3-cyclohexen-1-ol; ethyl 2,6,6-trimethyl-1,3-cyclohexadiene-1-carboxylate; 2,4-Dimethyl-4-phenyltetrahydrofuran; Ethyl propanedioate; 2,6-dimethyl-7-octenyl-2-yl acetate; (Z)-3,7-Dimethylocta-2,6-dienenitrile; exo-1,7,7-Trimethylbicyclo(2.2.1)hept-2-ylpropionate; cis-3,7-Dimethyl-2,6-octadien-1-yl ethanoate; 3-Methyl-4-(2,6,6-trimethylcyclohex-1-enyl)but-3-en-2-one; 2-Isopropanyl-5-methylhex-4-enyl acetate; 2,4-Dimethylcyclohexylmethyl acetate; 3,5-Dimethylcyclohex-3-ene-1-methyl acetate; VERDORACINE; 1-Phenylethyl propionate; 2,4-Dimethylcyclohex-3-ene-1-methanol; p-Isopropylbenzaldehyde; undecanal; 2-ethylidene-6-isopropoxy-bicyclo[2.2.1]heptanes; 3-Methyl-5-propyl-2-cyclohex-1-one; 8,8-dimethyl-7-[1-methylethyl]-6,10-dioxaspiro[4,5]decane; 3,7-Dimethyl-1,6-octadien-3-yl propionate; 2-Methyldecanal; 1,1-Dimethoxy-2-phenylpropane; c-tertiary butyl cyclohexanol; (2E,6Z)-nona-2,6-dienenitrile; 4-n-Butyl-4-hydroxybutyric acid lactone; CRESSANTHER; 3,7-dimethyl-6-octen-1-yl formate; 2-Phenylethyl acetate; 3,7-dimethyl-6-octenl-1-yl acetate; 8,9-epoxy cedrane; p-isopropylcyclohexanol; 2,6-dimethyl-2-octanol; 4-Isopropyl cyclohexanol; p-tert-Butylcyclohexyl acetate; cis-6-nonenol; 5-Methyl-2-(1-methylethyl)cyclohexanol; gamma.-methylionone; Ethyl 2,4-dimethyldioxolane-2-acetate; 1-Methyl-4-isopropylcyclohexane-8-ol; JASMATONE™ (Perfumer's Apprentice, Santa Cruz, Calif.); 3,7-Dimethyl-1-octen-7-ol; cis-3-hexenyl methyl butyrate; phenylethyl formate; trans-3,7-Dimethyl-2,6-octadien-1-yl acetate; 4-(2,6,6-Trimethyl-1-cyclohexen-1-yl)-3-buten-2-one; 2,4-dimethyl cyclohexane methanol; cis-6-Methyl-1-oxaspiro[4.5]decan-2-one; 2-Methylpent-2-en-1-oic acid; 1.a., 3.a., 6.a.)-2',2',3,7,7-Pentamethylspiro(bicyclo[4.1.0]heptane-2,5'-(1.3)dioxane; g-nonalactone; 10-undecenal; alpha.-ionone; 1-methyl-1-methoxycyclododecane; 3,7-Dimethyl-1,6-octadien-3-yl 2-methylpropanoate; 2,2,5-trimethyl-5-pentylcyclopentanone; cumin nitrile; 4-Methoxybenzyl acetate; 3,7-Dimethyl-1,6-nonadien-3-ol; cis-2,6-Dimethyl-2,6-octadien-8-ol; spiro[furan-2(3H), 5'-(4,-methane-5H-indene)], decahydro ethyl safranate; 1-p-Menthen-8-ol, 1-Methyl-4-isopropyl-1-cyclohexen-8-ol 5,9-Dimethyl-4,8-decadienal benzyl-n-butyrate; (E)-3,7-Dimethyl-2,6-octadienyl 2-methylcrotonate; 2-Methyl-3-phenyl-2-propenal; o-t-amyl-cyclohexanyl acetate; 3,6-dihydro-4-methyl-2-phenyl-2H-pyran; Octyl 2-methylpropanoate; dimethyl benzyl carbinyl acetate; 3-Methyl-1,4-octalactone; 2-Methyl-4-phenyl-2-butanol; 2,6-Nonadienol; Isobutyl phenylacetate; (R-(E))-1-(2,6,6-Trimethyl-2-cyclohexen-1-yl)pent-1-en-3-one LEVISTAMEL; 3,7-dimethyl-1,6-nonadien-3-ylacetate; 1-(2,4-Dimethyl-3-cyclohexenyl)-2,2-dimethylpropan-1-one[0466].alpha., .alpha.-dimethylphenethyl alcohol; (E)-1-(2,4,4-Trimethyl-2-cyclohexen-1-yl)-2-buten-1-one; 1-(2,6,6-Trimethyl-1-cyclohexen-1-yl)pent-1-en-3-one; 2,4,6-Trimethyl-3-cyclohexene-1-methanol; trans-3,7-Dimethyl-2,7-octadien-1-ol; 1,1-Diethoxy-3,7-dimethyl-2,6-octadiene; 1-Phenyl-4-penten-1-one; cedryl methyl ether; 1-Methyl-4-isopropenylcyclohexan-3-ol; phenylethyl isoamyl ether; 3-Methylene-7-methyl-1-octene-7-yl acetate; 6-ethylideneoctahydro-5,8-methano-2H-benzopyran; 3,7-Dimethyl-1-octanol; 3,7-Dimethyl-1,6-octadien-3-yl butyrate; 2-hexyl-2-cyclopenten-1-one; Methoxycyclodecan; 1-Cyclohexylethyl 2-butenoate; 5,6-epoxy-2,6,10,10-tetramethylbicyclo[7.2.0]undecane; Tetrahydro-4-methyl-2-phenyl-2H-pyran; acetaldehyde ethyl phenylethyl acetal; trans-3,7-Dimethyl-2,6-octadien-1-yl propionate; 6,10-dimethyl-5,9-undecadien-2-one; 6-Methyl-2-(4-methylcyclohex-3-enyl)hept-1,5-diene; 3-Methyl-2-(2-pentenyl)-2-cyclopenten-1-one isomers; 2-ethoxy-9-methylen-2,6,6-trimethylbicyclo[3.3.1]nonane[0491]Tetrahydro-4-methyl-2-propyl-2H-pyran-4-ylacetate; trans-3,7-Dimethyl-2,6-octadien-1-yl isobutyrate; p-methyltetrahydroquinone; decahydro-b-naphtyl acetate; dodecanal; 1-phenylethyl alcohol; (E)-7,11-Dimethyl-3-methylenedodeca-1,6,10-triene; 3(isopropylphenyl)butanal; ethyl-2-ethyl-6,6-dimethyl-2-cyclohexane; 3,7-dimethyl-2(3),6-nonadienenitrile; 6-methyl-.beta.-ionone; 7-methoxy-3,-dimethyloctanal; (Z)-1-(2, 6,6-Trimethyl-1-cyclohexen-1-yl)-2-buten-1-one; Allyl (3-methylbutoxy)acetate; 4-(2,5,6,6-Tetramethyl-2-cyclohexen-1-yl)-3-buten-2-one; 3-Methyl-2-butenyl benzoate; 3-(4-ethylphenyl)-2,2-dimethylpropanal; 3,5,6,6-tetramethyl-4-methyleneheptan-2-ol; 5-1-(2,6,6-Trimethyl-3-cyclohexen-1-yl)-2-buten-1-one; ethyl tricyclo[5.2.1.02.6]decan-2-carboxylate; .alpha.-1-(2,6,6-Trimethyl-2-cyclohexen-1-yl)-2-buten-1-one; 9-decanol; undecene 2 nitrile; Ethyl 2-nonynoate; 3,4,4a,5,8,8a-Hexahydro-3',7-dimethylspiro[1,4-methanonaphthalene-2-(1H), Z-oxirane]; p-tert-butylphenylacetonitrile; Ethyl 2,3-epoxy-3-methyl-3-phenylpropionate; 3,6-Dihydro-2,4-dimethyl-6-phenyl-2H-pyran; cis-trans-2-Methyl-2-vinyl-5(2-hydroxy-2-propyl) tetrahydrofuran; 4-methyl-3-decene-5-ol; Octahydro-4,7-methano-1H-indene-5-yl acetate; 2-Methylundecanal; 2-heptyl cyclopentanone; Ethyl(2R/S, 3R/S)-3-isopropylbicyclo[2.2.1]hept-5-ene-2-carboxylate; 6-sec-Butylquinoline; alkyl cyclohexyloxyacetate; 5-phenyl-5-methyl-3-hexanone; DISPIRONE™ (Quest International, Naarden, NL); 3-(4-tert-butylphenyl)propanal; 3,7-Dimethyl-6-octen-1-yl propanoate; phenylethyl isobutyrate; 1,2,3,4,5,6,7,8-Octahydro-8,8-dimethyl-2-naphthaldehyde; 1-(5,5-Dimethyl-1-cyclohexen-1-yl)pent-4-en-1-one; Methyl 2-hydroxybenzoate; Ethyl linalyl acetal; allyl cyclohexyl propionate; 3,7-Dimethyl-6-octen-1-yl 2-methylpropanoate; INDOCLEAR; AZARBRE; 2-Phenoxyethyl propionate; Ethyl 2-methoxybenzoate; 3-Phenyl-2-propenal; 2,2-Dimethyl-3-(p-ethylphenyl)propanal; 2,7-Dimethyl-10-(1-methylethyl)-1-oxaspiro[4.5]deca-3,6-diene[0545]1,3,4,6,7,8a-Hexahydro-1, 1,5,5-tetramethyl-2H-2,4-a-methanonaphthale-n-8(5H)-one; 5-methyl-3-heptanone oxime; cis-3-hexenyl benzoate; 2,3,4,5,6,7,8-Octahydro-8,8-dimethyl-2-naphthaldehyde; 5-Hydroxyundecanoic acid lactone; 4-methoxybenzaldehyde; 4-methyl-3-decen-5-ol; 4-n-Hexyl-4-hydroxybutanoic acid lactone; Allyl (2-methyl butoxy)acetate; p-Mentha-8-thiol-3-one; dodecahydro-3a,6,6,9a-tetramethylnaphto(2,1-b)-furan; 5-methyl-3-heptanone oxime; 4-(1-ethoxyvinyl)-3,5,5,5-tetramethylcyclo-hexanone; 2-(4-tert-butylbenzyl) propionaldehyde; Cyclohexyl lactone; Decanol; 1-(2,6,6-Trimethylcyclohexa-1,3-dienyl)-2-buten-1-one; 2-methyl-3-(4-isopropylphenyl)propanal; and 1-(4-isopropylcyclohexyl)-ethanol.

Materials useful as flavor/fragrance core materials that are characterized as delayed release fragrances or odorants are taught as having an acceleration value of less than 100 cm/sec$^2$. These materials characterized as deposition materials, are desirable because of ability to result in substantial deposition onto a surface making possible more sustained delivery of fragrance by postponing a substantial portion of the fragrance expression.

Materials useful as flavor/fragrance core materials characterized as having an acceleration value of less than 100 cm/sec$^2$ include: 2-Isobutyl-4-methyltetrahydro-2H-pyran-4-ol; .alpha.-Amino methylbenzoate; 1-(2,6,6-Trimethyl-2-cyclohexene-1-yl)-1,6-heptadien-3-one; 3,7-Dimethyl-6-octenyl 3-methylbutanoate; 4-Methoxybenzaldehyde diethyl acetal; [2-(Cyclohexyloxy)ethyl]benzene; AGARBOIS™ (Quest International, Naarden, NL); 2-Methoxy-4-(2-propenyl)phenol; 2(6)-methyl-8-(1-methylethyl)bicyclo[2.2.2] octa-5-en-2(3)-yl-1,3-di-oxolane[0179]2-Methyl-4-(2,2,3-trimethyl-3-cyclopenten-1-yl)-2-buten-1-ol; 3-Phenylpropyl alcohol; 2-(Phenylmethylene)heptanal; Ethyl(2E,4Z)-decadienoate; 7-Methyl-2H-benzo-1,5-dioxepin-3(4H)-one; Ethyl 2-hexylacetoacetate; 4,4a,5,9b-Tetrahydroindeno[1,2-d]-1,3-dioxine; 3-Methyl-5-phenylpentanenitrile; 3,4-Dihydro-2H-1-benzopyran-2-one; 2-Phenoxyethyl isobutyrate-Dodecanenitrile; 2-(3-Phenylpropyl)pyridine; 2,6,19- trimethyl-5,9-undecadienal; p-Isobutyl-a-methyl hydrocinnamaldehyde; trans-3,7-Dimethyl-2,6-octadien-1-yl-3-methylbutanoate; 6-.beta.-H-Cedran-8-ol, acetate; VETHYMINE™ (2,4-diethoxy-5-methylpyrimidine); Tricyclo(5.2.1.02,6)dec-3-en-9-ylisobutyrate; Trimethyl-13-oxabicyclo[10.1.0]trideca-4,8-diene; 3,7-Dimethyl-7-hydroxyoctanal; 2-Benzyl-4,4,6-trimethyl-1,3-dioxane; amberketal; 2,6,10-Trimethyl-9-undecenal; .gamma.-undecalactone; 10-undecen-1-ol; 1,2-Benzopyrone; 4-(p-Methoxyphenyl)-2-butanone; 3-Butyltetrahydro-5-methyl-2H-pyran-4-ylacetate; 3(Or 4)-(4-methylpenten-3-yl)cyclohex-3-ene-1-methyl acetate; 6,10-dimethyl-9-undecen-2-one; carbonic acid: 4-cyclootene-1-yl:methyl ester; 2-(2-Methylphenyl)ethanol; a,a-Dimethylphenethyl butyrate; 4-Hydroxy-3-methoxy-1-propenylbenzene; 1,5,5,9-Tetramethyl-13-oxatricyclo (8.3.0.0(4,9)tridecane); 2-Methyl-4-(2,2,3-trimethyl-3-cyclopentenyl)butanol; 2-isobutoxynaphthalene; 3,7,11-Trimethyl-2,6,10-dodecatrien-1-ol; Methoxy dicyclopentadiene carboxyaldehyde; 1,1'-Bicyclopentyl-2-yl 2-butenoate; 2-Cyclopentylcyclopentyl crotonate; [0219] methyl-2-naphtyl ketone; 1,2,3,4,4a,5,6,7-Octahydro-2,5,5-trimethyl-2-naphthol; 2H-Pyran-2-one, tetrahydro-6-(3-pentenyl); 3-methyldodecanonitrile; Dihydro-5-octylfuran-2 (3H)-one; 1,2,3,4,4a,7,8,8a-Octahydro-2,4-a,5,8a-tetramethyl-1-naphthyl formate FRUTONILE; magnolian; 3-Methyl-5-phenylpentanol; (E) and (Z) 6,10-Dimethylundeca-5,9-dien-2-yl acetate; alcohol C-12, dodecanol; 5,6-Dimethyl-8-isopropenylbicyclo(4.4.0)dec-1-en-3-one; 2-methyl-5-phenylpentanol; 3-methyl-5-phenylpentanol; 2-Methoxy-4-propenylphenyl acetate; 1-(1,2,3,4,5,6,7,8-Octahydro-2,3,8,8-tetramethyl-2-naphthaleneyl)et-hanone; Tricyclo[6.3.1.02,5]dodecan-1-ol, 4,4,8-trimethyl-, acetate, [1R-(1a,2a,5b,8b)]-; PIVACYLENE; Ethyl a,b-epoxy-b-phenylpropionate; 3-(4-ethyl phenyl)-2,2-dimethylpropanenitrile; (1R-(1a,4b,4ae,6b,8ae))-Octahydro-4,8a,9,9-tetramethyl-1,6-methano-1(2H)-naphthol; 2-methyl-3-(3,4-methylenedioxyphenyl)propanol; 3-Methylbutyl .alpha.-hydroxybenzoate; 2-Ethyl-4-(2,2,3-trimethyl-3-cyclopenten-1-yl)-2-buten-1-ol; 1,3-Benzodioxole-5-carboxaldehyde; benzyl alcohol; 1-Phenyl-3-methyl-3-pentanol; 2-Ethyl-2-prenyl-3-hexenol; 4-Acetyl-6-t-butyl-1,1-dimethylindan; alpha.-hexylcinnamic aldehyde; 2-Oxo-1,2-benzopyran; 3aR-(3aa,5ab,9aa,9bb)Dodecahydro-3a,6,6,9a-tetramethylnaphtho(2,1-b-)furan; hydroxycitronella) dimethyl acetal; 2-Methyl-4-phenylpentanol; 3,7,11-Trimethyldodeca-1,6,10-trien-3-ol mixed isomers; a,b,2,2,3-Pentamethylcyclopent-3-ene-1-butanol; 3,12-tridecadien-nitrile; 3a,4,5,6,7,7a-Hexahydro-2,6(or 3,6)dimethyl-4,7-methane-1H-inden-5-ol[0257]3-Phenyl-2-propan-1-ol; 4-(2,6,6-Trimethylcyclohexyl)-3-methylbutan-2-ol; 4-(3,4-Methylenedioxyphenyl)-2-butanone; 3,4-dimethoxybenzaldehyde; SINODOR™ (Quest International, Naarden, NL); 3-Methyl-5-(2,2,3-trimethyl-3-cyclopenten-1-yl)pent-4-en-2-ol; Ethoxymethoxy) cyclodecane; 2-ethoxy-4-methoxymethylphenol; 2-[2-(4-Methylcyclohex-3-en-1-yl)propyl]cyclopentanone; 4-(4,8-Dimethyl-nona-3,7-dienyl)pyridine; (E,E,E)-2,6,10-Trimethyldodeca-2,6,9,11-tetraen-1-al; 4-tricyclodecylidene butanal; Methyl 3-phenylpropenoate; 7-Methyl-2H-benzo-1,5-dioxepin-3 (4H)-one; amber core; 3-(2-bornyloxy)-2-methyl-1-propanol (exo); 3-Phenyl-2-propen-1-yl 3-methylbutanoate; trans-2,4-Dimethyl-2-(5,6,7,8-tetrahydro-5,5,8,8-tetramethyl-2-naphthalenyl)-1,3-dioxolan; a-Cyclohexylidene benzeneacetonitrile; 3-(Hydroxymethyl)nonan-2-one; Benzoic acid, 2-hydroxy-, 3-methyl-2-butenyl ester; cedryl methyl ketone; cis-4-Cyclopentadecenone; 6-Ethyldineoctahydro-5,8-methano-2H-1-benzopyran-2-one; 6-cyclohexadecen-1-one; cyclopentadecanone; 3,3-Dimethyl-5-(2,2,3-trimethyl-3-cyclopenten-1-yl)-4-penten-2-ol[0285]methyl dihydrojasmonate; Cyclopentadecanolide; 1,3-Dioxane, 2-(2,4-dimethyl-3-cyclohexene-1-yl)-5-methyl-5-(1-methylpropyl)-3,7-dimethyl-1,6-octadien-3-yl benzoate; Methyl (2-pent-2-enyl-3-oxo-1-cyclopentyl) acetate; 2-tert-butylcyclohexyl carbonate; 4-(4-hydroxyphenyl)-2-butanone; 1,3,4,6,7,8-Hexahydro-4,6,6,7,8,8-hexamethylcyclopenta-.gamma.-2-benzopyran; methyl-2-hexyl-3-oxocyclopentanedecarboxylate; and 3-methylcyclopentadecanone.

The shellac component used to form the protective water- and heat-resistant second coating is known to those skilled in the art. Shellac is a natural product which has film-forming properties. Shellac is not water-soluble, and has a melting point in the range of from 65 to 85° C. Accordingly, in order to form the protective second coating in accordance with the present invention, the shellac must typically be dissolved in a solvent medium before being applied to form the second coating. The solvent may then be removed from the coating, leaving the shellac protective coating. An exemplary solvent which may be used to form a shellac coating is an alcohol solvent such as ethanol, propanol, iso-propanol, butanol, butylglycyl, benzyl alcohol, or an acetone-water mixture. An example of a suitable alcohol is 200 proof ethanol.

An aqueous shellac dispersion may also be employed to form a protective coating consistent with the teachings of U.S. Pat. Nos. 4,515,769; 5,567,438 and 6,302,950. While shellac is water-insoluble, it is possible to form a shellac coating using an alkaline aqueous solution of shellac, such as an aqueous solution of shellac in ammonium hydroxide. The aqueous solution of shellac has been reported to coat faster than an alcoholic solution of shellac, and the use of such an alkaline aqueous coating may thus be an advantage in the present invention.

Alternatively, a shellac coating may be applied in the form of a melt.

Preferably, the shellac comprises from about 30 to about 60% by weight of the second coating composition as applied in the presence of a solvent as a protective coating over the first coating. Once applied, the solvent may be removed at a temperature in the range of about 25 to 90° C.

As the shellac is of natural origin, its chemical identity may vary from source to source as described in U.S. Pat. No. 4,810,534. Depending upon the particular end use, some processing of the shellac may be required. For instance, when used in a food application, dewaxed, filtered, carbon black decolorized, non-chemically modified or virgin shellac should be employed. The use of shellac coatings/dispersions is also discussed in U.S. Pat. Nos. 4,810,534; 5,567,438 and 6,302,950, and U.S. Patent publication 2006/0233917.

The dual coating scratch-and-sniff coating of the present invention may be used in a variety of environments as shown in FIGS. 3-7. Due to the water- and heat-resistance of the protective coating, it may be used in conjunction with the cap of a bottle, wherein the flavor or fragrance is released upon removal of the bottle cap.

Figure 3:
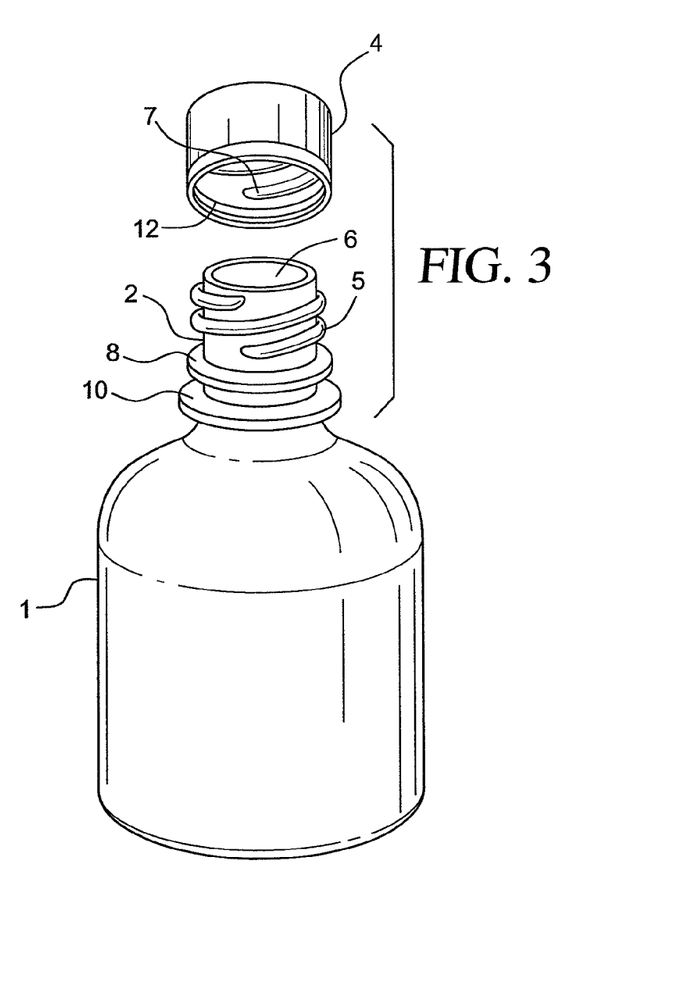
FIG. 3 is a perspective view of a bottle with which the scratch-and-sniff coating of the present invention may be employed.
Figure 4A:
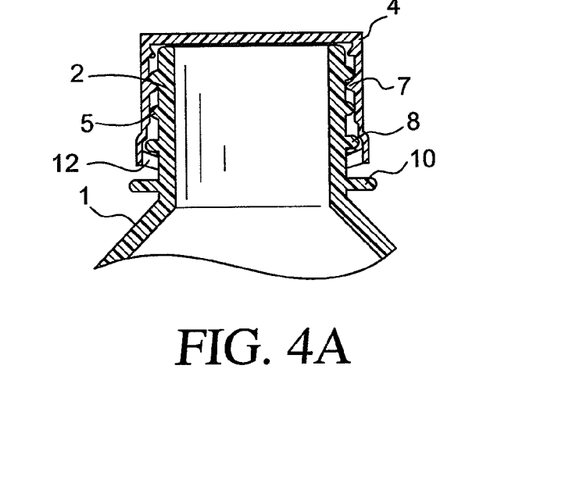
FIGS. 4A and 4B are cross-section views of the neck and bottle cap of the bottle of FIG. 3.
Figure 4B:
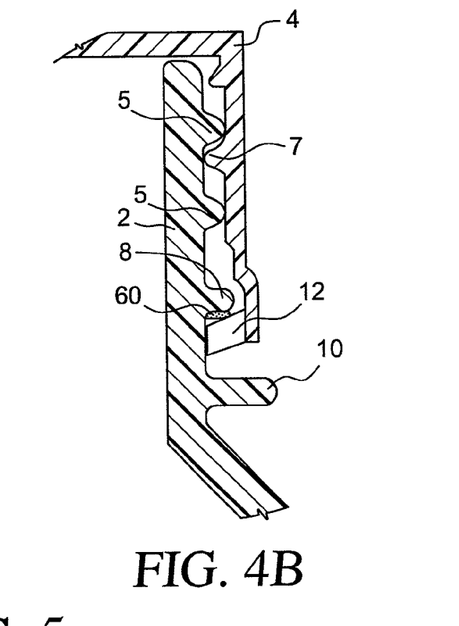

FIGS. 3-4 depict a bottle with a screw-on cap that may be used with the scratch-and-sniff coating of the present invention. Bottle 1 has cap 4 having screw-on threads 7 and security ring 12. The bottle 1 has neck 2 with open end 6, lower neck ring 10, upper neck ring 8, and screw threads 5. As shown in FIG. 4B, the scratch-and-sniff coating 60 may be formed, for example, along a surface of neck ring 8. Alternatively, the coating may be formed along a surface of a screw thread. In either instance, as the bottle cap is removed from the neck of the bottle, the coating will be disrupted and flavor/fragrance released. When the cap is removed from the bottle, the security ring 12 is forced upwardly into contact with coating 60, releasing the flavor/fragrance contained therein. U.S. Pat. No. 6,102,224 discloses the use of a fragrance coating on the neck of a bottle.

Figure 5:
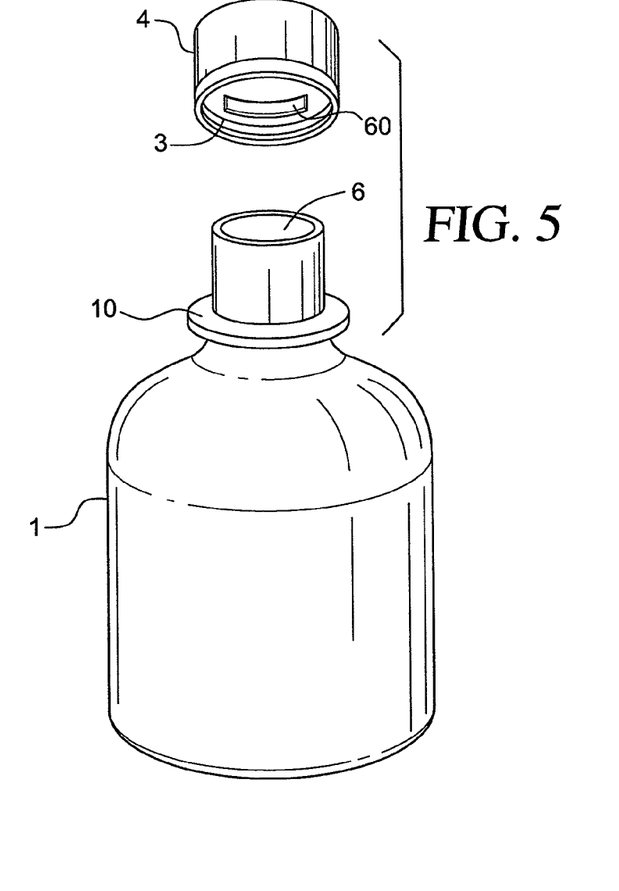
FIG. 5 is a perspective view of another embodiment of a bottle with which the scratch-and-sniff coating of the present invention may be employed.
Figure 6:
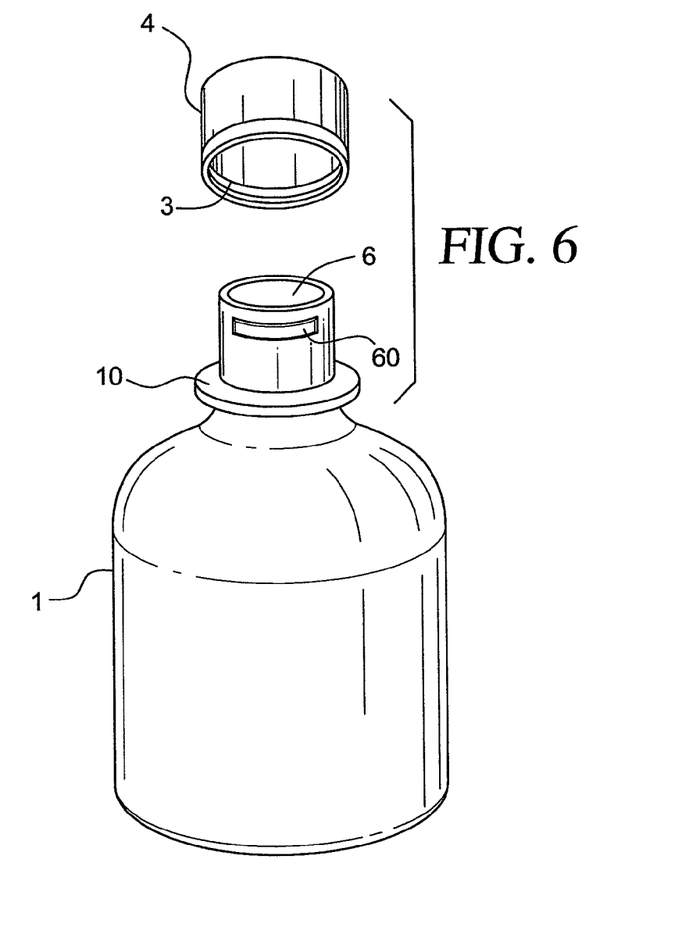
FIG. 6 is another embodiment is a perspective view of yet another embodiment of a bottle with which the scratch-and-sniff coating may be employed.

FIGS. 5 and 6 depict an embodiment where a push-on/pull-off bottle cap is used on a non-threaded neck of a bottle or jug. In such an instance, the scratch-and-sniff coating 60 may be formed on either the interior of the bottle cap (FIG. 5), or alternatively, along the surface of the neck of the bottle (FIG. 6).

Figure 7:
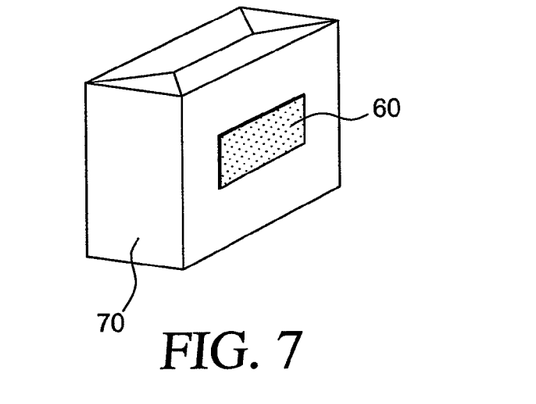
FIG. 7 is a perspective view of a package showing the scratch-and-sniff coating of the present invention on a side thereof.

By way of additional embodiment, the scratch-and-sniff coating 60 may be formed on the exterior of a package 70 as shown in FIG. 7. Due to the water- and heat-resistance of the coating, the application of the coating to the exterior of a package may occur with advantage without fear of degradation.

The coating of the present invention may also be used in connection with overwrapped packages having a tear strip. Also, the coating of the present invention may be employed with the packaging of products which may or may not use an overwrap with a tear strip such as dairy products (ice cream, cream cheese, cheese spreads), cereals, cake mixes, snacks, baked goods, confections, etc. The coating of the present invention may also be used with packaging of consumer goods such as pharmaceuticals, paper products, and cleaning products.

The use of the scratch-and-sniff coating of the present invention in association with such packaging enables the consumer to experience a pleasant flavor/fragrance upon opening of the package or bottle, with the scratch-and-sniff coating being relatively impervious to the effects of heat and moisture during transport and storage of the package or bottle upon which the scratch-and-sniff coating is provided.

EXAMPLES

The scratch-and-sniff coating of the present invention was formed as follows. An orange oil slurry was initially formed by the following steps. Span-80 (0.5 g) and Pectin LM-101AS (3.0 g) were dissolved in 100 ml. of deionized water by mechanically stirring for 10 minutes at room temperature. Orange oil (25 g) was added and mechanically mixed at 2500 rpm for 20 minutes to form an orange oil emulsion. To this emulsion, 12 ml $CaCl_2$ (0.2% water solution) was added, and the whole mixture mechanically stirred for another 10 minutes. Additional Pectin ((LM-101AS, 8 g) was added and mechanically stirred at 1800 rpm for 20 additional minutes. During this procedure, a light yellow, sticky slurry was formed and ready to use. The average orange oil droplet size in the slurry is about 5 microns.

This procedure was successfully repeated with lemon oil instead of orange oil.

A furaneol (or strawberry flavored) slurry was also made in accordance with the present invention. Furaneol (5 g), Pectin (LM-101AS, 10 g) and propylene alcohol (3 g) were mechanically stirred at 1000 rpm in 60 ml water for 10 minutes. Increases in stirring speed to 2500 rpm for 30 minutes occurred resulting in the furaneol slurry.

A shellac solution was prepared by dissolving dewaxed shellac (30 g) in 70 g of anhydrous ethanol by magnetic stirring for about two hours.

The scratch-and-sniff coating was formed as follows from the above coating compositions. The surface of a microslide was brush coated with an amount of one of the above prepared flavor slurries. The coating was dried at room temperature in a fume hood, or alternatively, in an oven at a temperature below 65° C. The shellac coating was applied over the dried first coating. Ethanol present in the second coating was removed by evaporation at room temperature in a fume hood, or alternatively in an oven at a temperature below 65° C. The thus-prepared coating was smell-free, and the flavor released and immediately sensed when the surface of the coating was scratched. Desirably, the coating was also found to be resistant to hot water up to 70° C. as measured by dipping the coated slide into a 70° C. water bath for 3 minutes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a scratch-and-sniff coating, comprising the steps of:
   (a) forming a first coating of the scratch-and-sniff coating by applying on an exterior surface of a container for a consumer article a coating comprised of a non-encapsulated flavor/fragrance component and a polysaccharide component;
   (b) drying said coating of step (a);
   (c) forming a second coating of the scratch-and-sniff coating by applying a protective water- and heat-resistant second coating on said dried coating of step (b), said second coating comprised of a shellac component; and
   (d) drying said second coating.

2. The method of claim 1, wherein said flavor/fragrance is selected from the group consisting of spearmint oil, cinnamon oil, oil of wintergreen, peppermint oil, clove oil, bay oil, anise oil, eucalyptus oil, thyme oil, cedar leaf oil, oil of nutmeg, allspice, oil of sage, mace, oil of bitter almonds, cassia oil, vanilla, citrus oils and fruit essences.

3. The method of claim 1, wherein said polysaccharide is selected from the group consisting of alginic acid, alginic acid salts and derivatives thereof, pectin, locust bean gum, guar gum, pectinic acid, a pectinate, a pectate, polygalacturonic acid, carrageenan, cross-linkable cellulose or a derivative thereof, xanthan gum, agar, cross-linkable starch or a cross-linkable guar gum.

4. The method of claim 1, wherein said first coating is dried at a temperature in the range of about 30 to about 90 ° C.

5. The method of claim 1, wherein said second coating includes a solvent and is dried at a temperature in the range of about 25 to about 90 ° C.

6. The method of claim 1, wherein said second coating is applied in the form of a mixture of said shellac and a solvent for said shellac.

7. The method of claim 1, wherein said shellac coating is applied in the form of an aqueous dispersion of said shellac.

8. The method of claim 1, wherein the consumer article is a package.

9. The method of claim 1, wherein the consumer article is a bottle or a jug.

10. The method of claim 8, wherein the package is an overwrapped package with a tear strip.

11. The method of claim 1, further comprising the step of:
   (e) scratching the second coating in order to release the flavor/fragrance component and the polysaccharide component.

12. The method of claim 1, wherein the substrate in the step of forming a first coating of a scratch-and-sniff coating is a planar surface.

* * * * *